March 21, 1939.     F. MENDERMAN     2,151,609
FASTENER
Filed Oct. 25, 1938
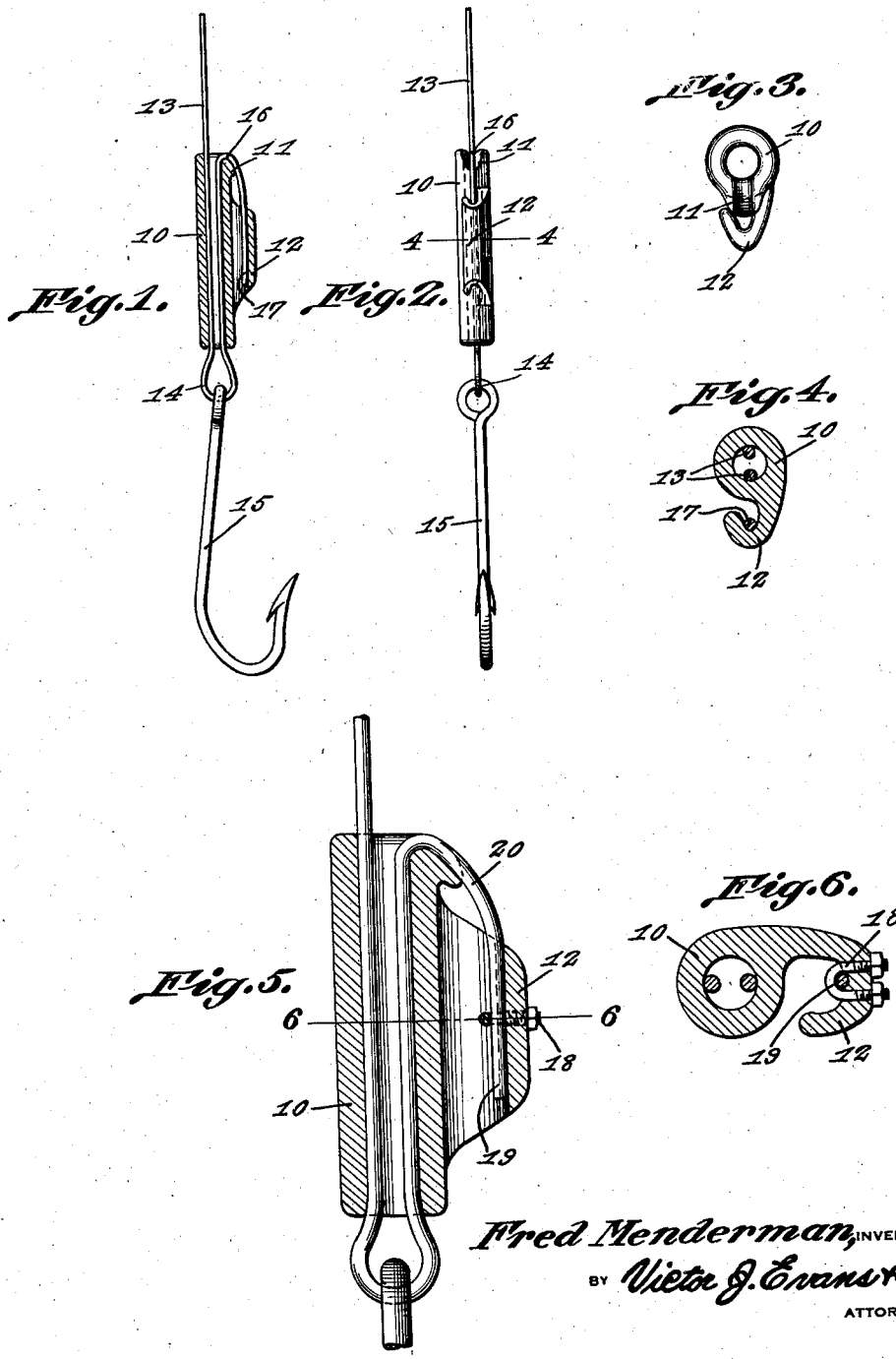
Fred Menderman, INVENTOR
BY Victor J. Evans & Co.
ATTORNEYS Patented Mar. 21, 1939

2,151,609

UNITED STATES PATENT OFFICE 2,151,609

FASTENER

Fred Menderman, Miami, Fla., assignor of one-third to C. M. Marlow, Miami, Fla.

Application October 25, 1938, Serial No. 236,939

2 Claims. (Cl. 24—129)

This invention relates to fasteners adapted for use in connection with fishing leader wires, clothes lines, or any wire to be made fast to any object.

An object of the invention is to provide a fastener which will permit fish hooks, plugs, and other objects to be easily changed without the aid of pliers or other tools and which will not leave the end of the leader wire extending out to snag on seaweed or stick the hands of the operator when taking fish off of the hook.

A further object of the invention is to provide a fastener of this type which will require minimum time to change a hook without cutting the wire, which can be easily manipulated in the dark, and which will not readily be dislodged or broken.

A further object is to provide a device of this character, which will be formed essentially of a single integral part, and which will be inexpensive to manufacture.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a fastener constructed in accordance with the invention and shown applied to a wire fishing leader.

Figure 2 is an end elevation of the device shown in Figure 1.

Figure 3 is an enlarged plan view of the fastener.

Figure 4 is a cross sectional view taken on the line 4—4 of Figure 2.

Figure 5 is an enlarged longitudinal sectional view of the fastener showing the use of a U-bolt to detachably secure the end of a wire rope or cable.

Figure 6 is a cross sectional view taken on the line 6—6 of Figure 5.

Referring now to the drawing in which like characters of reference designate similar parts in the various views, the fastener is shown to comprise a tube 10 provided at its upper end with a U-shaped lip 11. A catch 12 of substantially U-form in cross section is located on the side of the tube and forms an integral part of the tube. One side of the catch is connected to the tube and the edge of the other side of the catch is spaced from the tube to provide an entrance to the catch.

The upper end of the catch is spaced downwardly from the U-shaped lip 11 of the tube, the lip inclining radially beyond the tube and curving downwardly in the direction of the upper end of the catch.

In operation the end of a wire fishing leader 13, for example, is passed through the tube and looped upon itself as shown at 14 to secure a fish hook 15, the looped end of the leader then being passed reversely back through the tube and bent downwardly over the U-shaped lip as shown at 16, and from thence passed laterally through the open side of the catch into the catch as shown at 17.

When the device is to be used in connection with wire rope or wire cable, the catch 12 is provided with a U-bolt 18 which positively holds the lower end 19 of the free end portion 20 of the rope or cable which has been looped through the tube 10, from becoming accidentally disengaged from the catch. This bolt is not necessary when the fastener is to be used in connection with resilient wire such as the leader wire of fishing tackle as above described.

From the above description it is thought that the construction and operation of the invention will be fully understood without further explanation.

What is claimed is:

1. A fastener comprising a tube adapted to receive a looped wire, a U-shaped lip at the upper end of the tube upon which the free end of the looped wire is adapted to be bent downwardly along the exterior of the tube, and a catch of substantially U-form in cross section disposed on the side of the tube and forming an integral part of the tube, one side of the catch being connected to the tube and the edge of the other side of the catch being spaced from the tube to provide an entrance to the catch for said bent free end of the wire, the upper end of the catch being spaced downwardly from the U-shaped lip of the tube and the lip inclining radially beyond the tube and curving downwardly in the direction of the upper end of the catch.

2. A fastener comprising a tube adapted to receive a looped wire, a U-shaped lip at the upper end of the tube upon which the free end of the looped wire is adapted to be bent downwardly along the exterior of the tube, a catch of substantially U-form in cross section disposed on the side of the tube and forming an integral part of the tube, one side of the catch being connected to the tube and the edge of the other side of the catch being spaced from the tube to provide an entrance to the catch for said bent free end of the wire, the upper end of the catch being spaced downwardly from the U-shaped lip of the tube and the lip inclining radially beyond the tube and curving downwardly in the direction of the upper end of the catch, and a U-bolt engaged through said catch for positively holding said bent portion of the wire from becoming accidentally disengaged from the catch.

FRED MENDERMAN.